(12) United States Patent
Fortmann et al.

(10) Patent No.: US 10,643,004 B2
(45) Date of Patent: May 5, 2020

(54) TECHNIQUES FOR ENABLING A SOFTWARE APPLICATION TO ACCESS FILES AT A COMPUTING DEVICE WHILE ENFORCING PRIVACY MEASURES

(71) Applicant: Apple Inc., Cupertino, CA (US)

(72) Inventors: Johannes B. Fortmann, San Francisco, CA (US); Pierre d'Herbemont, San Francisco, CA (US); Jean-Gabriel Morard, Chaville (FR)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 15/713,400

(22) Filed: Sep. 22, 2017

(65) Prior Publication Data

US 2018/0336371 A1    Nov. 22, 2018

Related U.S. Application Data

(60) Provisional application No. 62/507,152, filed on May 16, 2017.

(51) Int. Cl.
*G06F 21/00* (2013.01)
*G06F 21/62* (2013.01)
*H04L 29/06* (2006.01)
*G06F 21/53* (2013.01)

(52) U.S. Cl.
CPC .......... *G06F 21/6281* (2013.01); *G06F 21/53* (2013.01); *G06F 21/6272* (2013.01); *H04L 63/101* (2013.01); *G06F 2221/2115* (2013.01); *G06F 2221/2149* (2013.01)

(58) Field of Classification Search
CPC ................ G06F 21/6209; G06F 21/53; G06F 2221/2149; G06F 21/6281; G06F 21/6272; G06F 2221/2115; H04L 63/101
See application file for complete search history.

(56) References Cited

U.S. PATENT DOCUMENTS

| | | | | |
|---|---|---|---|---|
| 5,870,546 A | * | 2/1999 | Kirsch | H04L 12/1471 709/205 |
| 5,987,454 A | * | 11/1999 | Hobbs | G06F 16/332 |
| 6,560,639 B1 | * | 5/2003 | Dan | G06F 16/958 709/218 |
| 6,638,314 B1 | * | 10/2003 | Meyerzon | G06F 16/951 715/234 |

(Continued)

*Primary Examiner* — Mahfuzur Rahman
(74) *Attorney, Agent, or Firm* — Dickinson Wright RLLP

(57) ABSTRACT

This application relates to a technique that enables a software application to access files at a computing device while enforcing privacy measures. The technique includes a file browser that can act on behalf of a software application to communicate a user file selection to a relevant file access service. While operating in a sandboxed mode, the file browser can communicate the user file selection while the software application is unaware of the file browser's activities. The file browser can display a set of files that are available for user selection using an enumeration logic that is distinct from an enumeration logic implemented by either the software application or the relevant file access service. When a user file selection is detected, the file browser can assist the software application in receiving a secure URL to enable the software application to directly-access the file associated with the user file selection.

20 Claims, 12 Drawing Sheets

(56) References Cited

U.S. PATENT DOCUMENTS

| | | | | |
|---|---|---|---|---|
| 6,789,103 B1* | 9/2004 | Kim | ............... | H04L 41/085 707/999.009 |
| 7,269,664 B2* | 9/2007 | Hutsch | ............... | G06F 9/541 345/672 |
| 7,328,401 B2* | 2/2008 | Obata | ............... | G06F 16/951 715/205 |
| 7,484,245 B1* | 1/2009 | Friedman | ............... | G06F 21/52 380/283 |
| 8,370,420 B1* | 2/2013 | Decasper | ............... | G06F 16/9574 709/202 |
| 8,656,472 B2* | 2/2014 | McMurtry | ............... | G06F 21/335 726/9 |
| 9,519,802 B2* | 12/2016 | Dutta | ............... | G06F 21/602 |
| 9,553,758 B2 | 1/2017 | Rexer | | |
| 10,025,948 B1* | 7/2018 | Chou Fritz | ............... | G06F 21/6218 |
| 10,057,216 B2* | 8/2018 | Brunn | ............... | H04L 63/0421 |
| 10,089,403 B1* | 10/2018 | Trahan | ............... | H04L 67/02 |
| 10,210,256 B2* | 2/2019 | Zhu | ............... | G06F 17/2235 |
| 2005/0256943 A1* | 11/2005 | Morris | ............... | H04L 67/34 709/220 |
| 2007/0136794 A1* | 6/2007 | Chin | ............... | H04L 63/0807 726/5 |
| 2007/0162300 A1* | 7/2007 | Roever | ............... | G06Q 20/12 705/57 |
| 2011/0167492 A1* | 7/2011 | Ghosh | ............... | G06F 9/54 726/23 |
| 2011/0191687 A1* | 8/2011 | Takeda | ............... | G06F 15/177 715/736 |
| 2012/0054744 A1* | 3/2012 | Singh | ............... | G06F 21/53 718/1 |
| 2013/0074158 A1 | 3/2013 | Koskimies et al. | | |
| 2013/0346450 A1* | 12/2013 | Procopio | ............... | G06F 21/6218 707/783 |
| 2015/0113172 A1* | 4/2015 | Johnson | ............... | H04L 67/34 709/245 |
| 2015/0304369 A1 | 10/2015 | Sandholm et al. | | |
| 2016/0021207 A1* | 1/2016 | Dingwall | ............... | H04L 67/2814 709/203 |
| 2016/0062958 A1 | 3/2016 | Shirakawa | | |
| 2016/0150053 A1* | 5/2016 | Janczuk | ............... | H04L 67/1097 709/217 |
| 2018/0052573 A1* | 2/2018 | Comertoglu | ............... | G06F 3/0484 |
| 2018/0205632 A1* | 7/2018 | Ranjan | ............... | H04L 45/124 |

* cited by examiner

TECHNIQUES FOR ENABLING A SOFTWARE APPLICATION TO ACCESS FILES AT A COMPUTING DEVICE WHILE ENFORCING PRIVACY MEASURES

CROSS-REFERENCE TO RELATED APPLICATIONS

The present application claims the benefit of U.S. Provisional Application No. 62/507,152, entitled "TECHNIQUES FOR ENABLING A SOFTWARE APPLICATION TO ACCESS FILES AT A COMPUTING DEVICE WHILE ENFORCING PRIVACY MEASURES," filed May 16, 2017, the content of which is incorporated herein by reference in its entirety for all purposes.

FIELD OF INVENTION

The described embodiments relate generally to file selection techniques. More particularly, the present embodiments relate to techniques that can enable a software application to receive access to a file selected within a secure file browser that is sandboxed from the software application.

BACKGROUND

Modern computing systems generally utilize a file selection mechanism known as a "file picker," which is a graphical user interface tool that allows a user to select a file to be accessed by an application. In general, an application developer is required to implement a file picker that is specifically customized for an application so that the application can obtain access to one or more files on the user's computing device based on the user's selections. However, conventional methods for implementing a file picker for an application suffer from a number of flaws that have yet to be addressed. Among other issues, conventional methods fail to provide any level of security with respect to how the applications access files stored on the user's computing device. For instance, conventional methods typically expose all of the files on the user's computing device to any given application that invokes the file picker for a file selection procedure. In this fashion, the failure of conventional methods to implement security measures can result in any application obtaining access to potentially sensitive data stored on the user's computing device when a file selection procedure is being performed.

SUMMARY

Accordingly, the representative embodiments set forth herein disclose techniques that can enable a software application to receive access to a file selected within a secure file browser that is sandboxed from the software application.

One embodiment sets forth a method for enabling a software application to access files at a computing device while enforcing privacy measures. In particular, the method involves, at the computing device, (1) loading a file browser in association with the software application, in which the file browser is communicably coupled with one or more file access services instantiated at the computing device, and executes in a sandboxed mode such that the software application cannot identify any content displayed within the file browser, (2) displaying, within the file browser, a first plurality of files associated with a first file access service of the one or more file access services, and (3) in response to receiving, via the file browser, a selection of at least one file from the first plurality of files: providing, to the software application, a token that enables the software application to access only the at least one file from the first plurality of files.

Another embodiment sets forth a method for enabling a software application to access files at a computing device while enforcing privacy measures. In particular, the method involves, at the computing device, (1) responsive to a request to open a file in a file browser associated with the software application, communicating an availability list comprising one or more file access services to the file browser, in which the file browser executes in a sandboxed mode such that the software application cannot identify any content displayed within the file browser, (2) communicating a first plurality of files provided by at least one file access service to the file browser, and (3) in response to receiving, from the file browser, a selection of at least one file from the first plurality of files: communicating to the file browser, for receipt by the software application, a token that enables the software application to access only the at least one file from the first plurality of files.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
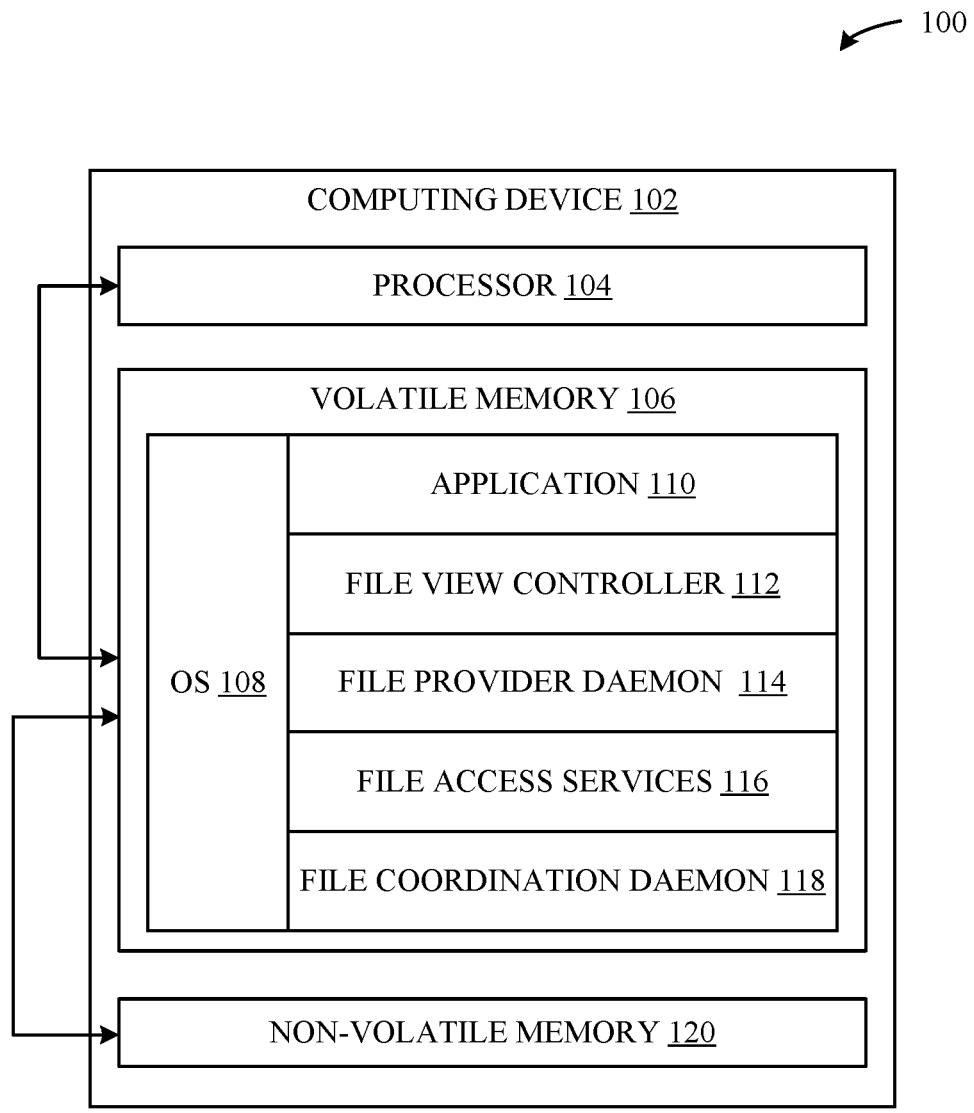
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

As described above, a conventional file picker—e.g., one invoked by a software application when a user is seeking to access a file—typically exposes all available files to the software application, which can violate the user's privacy and degrade overall security. For example, the software application can glean information about the content that is displayed within the file browser—e.g., files, directories, etc.—even when only a single item (or no item at all) is selected by a user.

Various embodiments set forth herein involve a file browser that enables a software application to access relevant files in a manner that does not needlessly expose, to the software application, all of the content on a user's computing device (e.g., local file systems) or on remote computing devices (e.g., a cloud-based file services). According to some embodiments, the file browser can act on behalf of the software application to communicate information about a user file selection (that occurs within the file browser) to one or more file access services (e.g., a local file system, a cloud file system, etc.) available on the user's computing device. In this manner, the file browser can operate in a sandboxed mode relative to the software application, and enable the user to browse his or her files while preventing them from being exposed to the software application. When a user selection of a file is detected, the file browser can assist the software application in ultimately receiving a secure Uniform Resource Locator (URL) that enables the software application to directly-access the file, which is described below in greater detail.

According to some embodiments, a file provider daemon can be logically disposed between the above-described file browser and the file access services. In particular, the file provider daemon can be configured to provide information to the file browser when the file browser is invoked. For example, the file provider daemon can (1) receive at least one set of files from at least one file access service, and (2) communicate the set of files to the file browser. According to some embodiments, the set of files can be enumerated according to an enumeration logic that is utilized by the file access service that provides the set of files. Additionally, and according to some embodiments, the file browser can be configured to implement an enumeration logic of its own to complement/override the enumeration logics associated with the various file access services that provide the sets of files. When a file selection is performed within the file browser, the file provider daemon can perform validation procedures through the use of "tokens" to determine whether the software application should be permitted to access the user-selected file. Upon completion of the validation procedures, the file provider daemon, through communications with the file browser, can assist the software application in receiving a secure URL to enable the software application to directly-access the file.

A more detailed description of the various techniques described herein, and the manner in which they can be implemented, is provided below in conjunction with 2A-2B, 3A-3D, 4, 5A-5B, 6, and 7.

Figure 7:
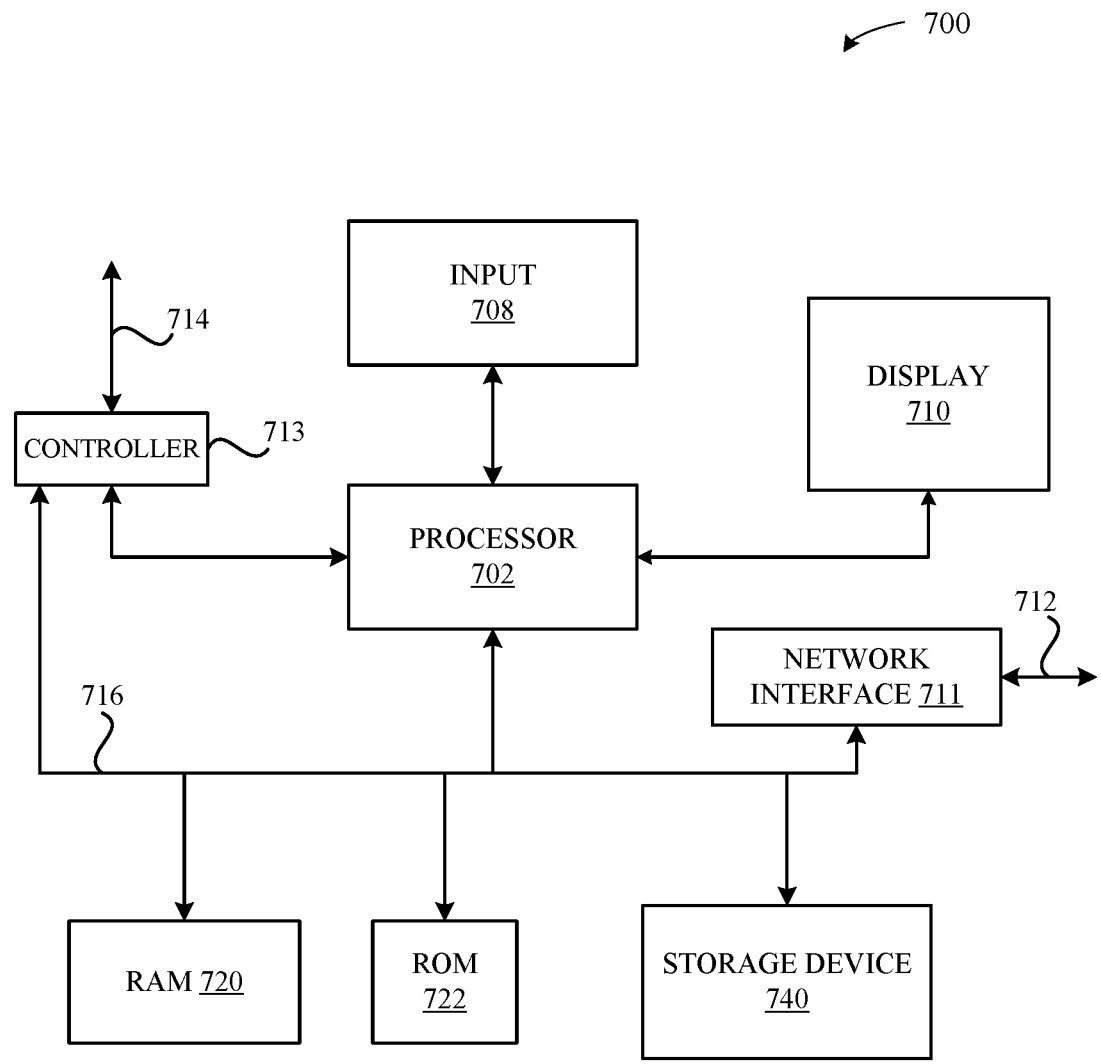
FIG. 7 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 7, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and the like. According to some embodiments, an operating system (OS) 108 can be loaded at the volatile memory 106, where the OS 108 can be enabled to execute a variety of applications that enable the various techniques described herein to be implemented. As described in greater detail herein, such applications can include an application 110, a file view controller 112, a file provider daemon 114, a file access service 116, and a file coordination daemon 118.

According to some embodiments, file view controller 112 can represent a file browser that operates independently (e.g., is sandboxed) from a host application that invokes the file browser, such as an application 110, and includes the functionality to generate user interfaces. It should be noted that the term "sandboxed" as applied herein is not meant to be limiting. For instance, a "sandboxed" mode can include, but is not limited to, any general security mechanism that can create a restrictive computing environment for one or more components on the computing device 102. In this fashion, components operating within a "sandboxed" mode on the computing device 102—e.g., the file view controller 112—can perform procedures in a manner in which outside entities (e.g., applications 110) are prohibited from obtaining access. Additional examples of components operating within a "sandboxed" mode are described in greater detail in FIGS. 2A-2B, 3A-3D, 4, 5A-5B, 6, and 7.

A user interface generated by file view controller 112 can include a list of files that are relevant to the application 110 and available for user selection. The user interface can be actively presented to a user via a display device (not illustrated in FIG. 1) coupled to computing device 102. As described in greater detail herein, the application 110 can be prevented from accessing/viewing the content displayed within the file browser, thereby enhancing the user's privacy and improving overall security. At the same time, the application 110 can obtain access to one or more files in accordance with selections made by the user within the file browser. In particular, file view controller 112 can exchange information with a file provider daemon (e.g., file provider daemon 114) to ultimately obtain a Uniform Resource Locator (URL) that can be used by the application 110 to access the file.

It should be noted that any reference to a daemon herein can, also or in addition, refer to any software, thread, or process. A non-limiting example of a daemon is a process or program that runs as a background process that can wait for events or times to perform operations. It should also be noted that any reference to an application herein is not meant to be limiting and can include any type of application. For instance, an application can include, but is not limited to, a word processing application, a spreadsheet application, a presentation application, and the like. Additionally, it should be noted that any reference to a file herein is not meant to be limiting and can include any type of file. For instance, a file can be at least any or a combination of documents, spreadsheets, presentations, messages, text, videos, audio files, images, and the like.

According to some embodiments, the file access services 116 set forth herein can provide file view controller 112 access to content stored in different areas, e.g., a local file system, a remote file system, a cloud file system, and so on. As described in greater detail herein, each of the file access services 116 can implement a respective enumeration logic that can be applied to the content (e.g., files/folders) managed within the domain of the file access service 116. According to some embodiments, file provider daemon 114—which is configured to communicate with the file access services 116—can provide, to file view controller 112, the file enumeration logics used by the different file access services 116. In turn, file view controller 112 can be configured to implement an enumeration logic of its own to complement/override the enumeration logics provided by the file access services 116. Additionally, file provider daemon 114 can provide, to file view controller 112, updated information about files that are managed by the file access services 116, to ensure that file view controller 112 dynamically displays up-to-date content that can potentially change while the file view controller 112 is invoked.

Additionally, and according to some embodiments, file coordination daemon 118 includes the functionality to orchestrate read/write access to files associated the file access services 116 (e.g., local file access services 116 or third-party file access services 116) in accordance with selections of files made within the file view controller 112. For instance, file coordination daemon 118—with the assistance of file provider daemon 114—can perform validation procedures that ensure only an authorized application can access a file selected within the file view controller 112. Additionally, file coordination daemon 118 can engage in cooperative communications with a number of different applications so that any application that seeks to access a selected file can receive an up-to-date version of the selected file—or, in some cases, prevent an open file currently being accessed by one application from being concurrently accessed by another application.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2B, 3A-3D, 4, 5A-5B, 6, and 7. As described in greater detail below, these components can be utilized to enable a software application to access files while enforcing privacy measures.

Figure 2A:
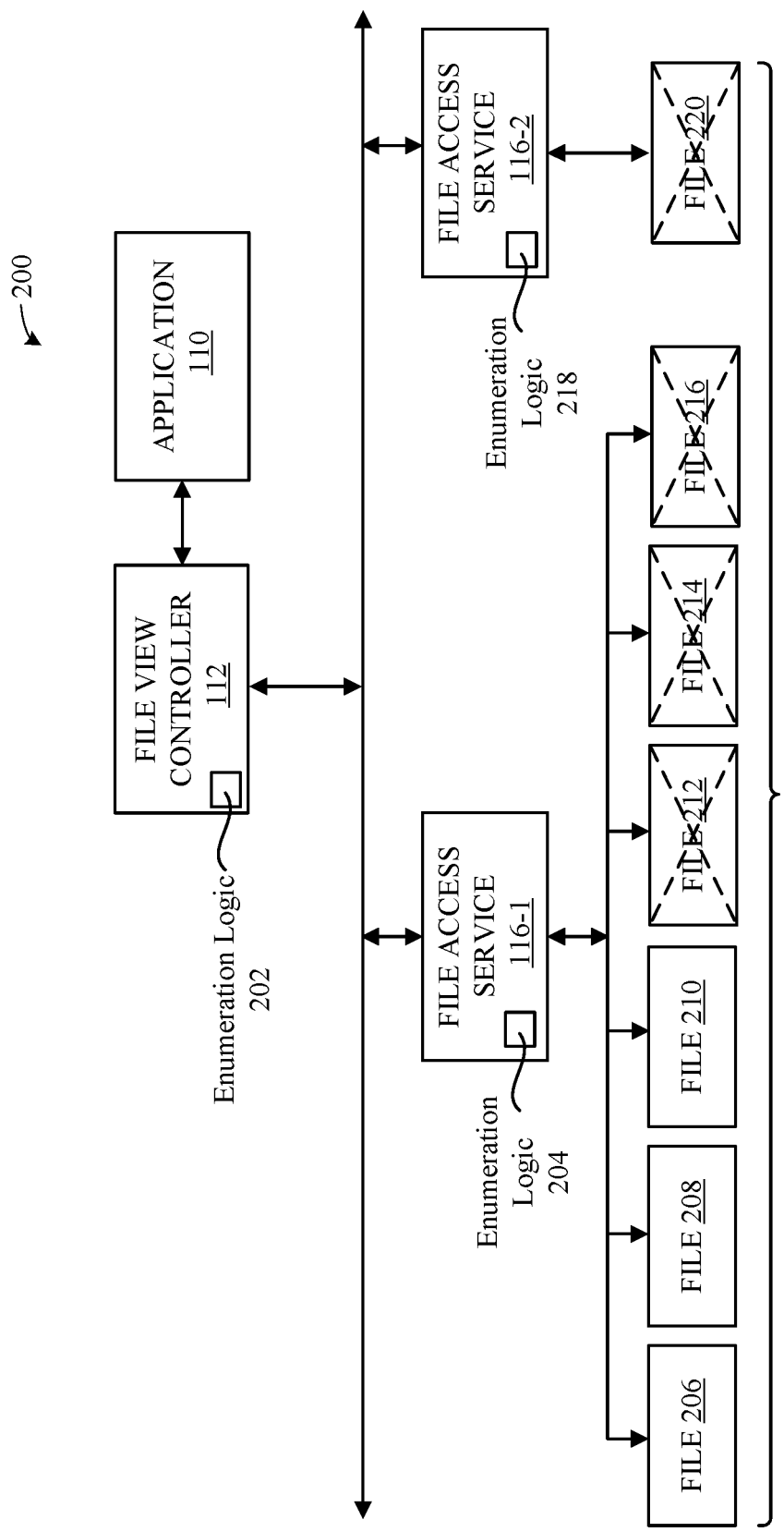
FIGS. 2A-2B illustrate exemplary user file selection processing procedures that can be performed to enable a software application to access files while enforcing privacy measures, according to some embodiments.
Figure 2B:
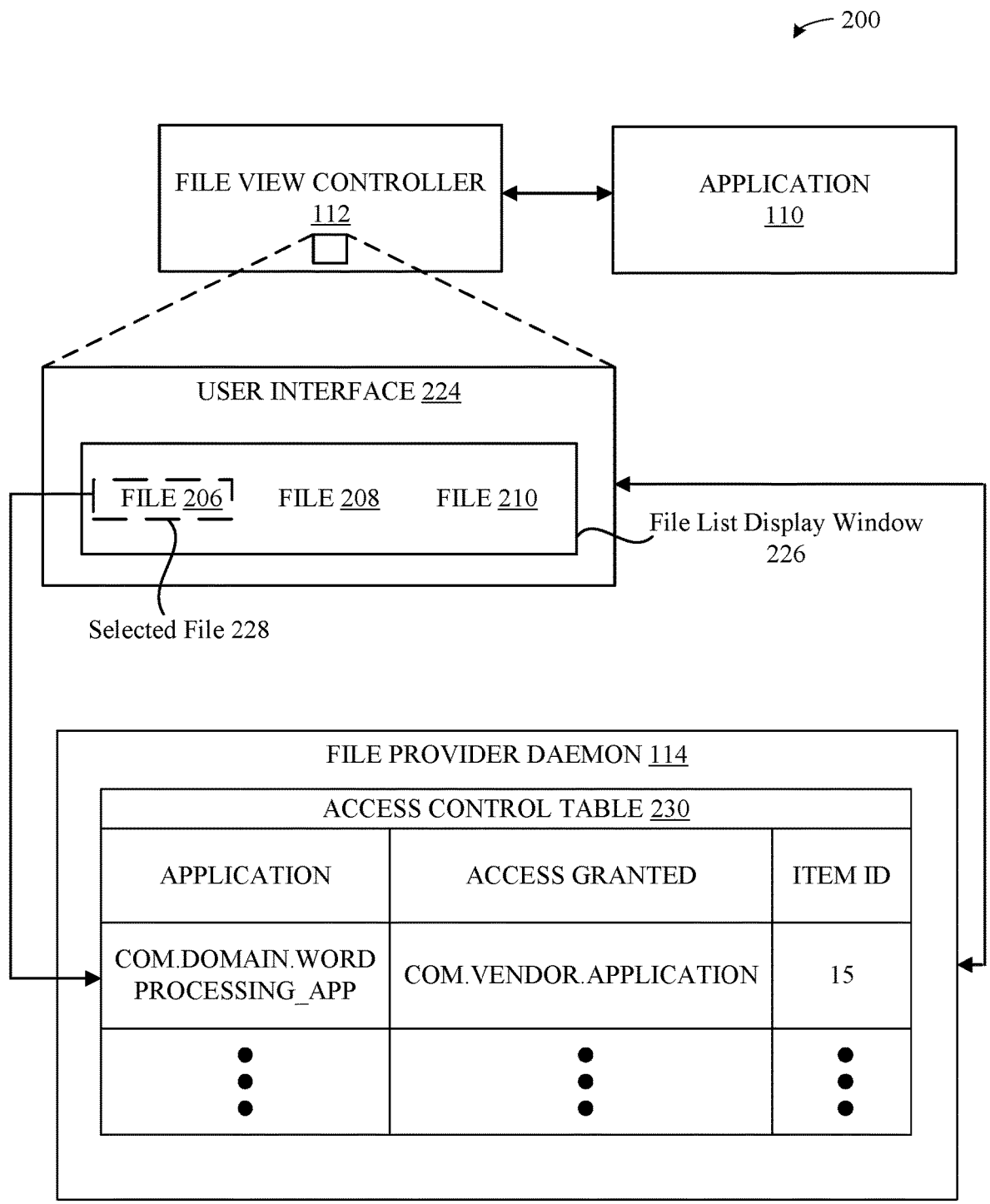

FIGS. 2A-2B illustrate an overview 200 of exemplary user file selection processing procedures that can be performed to enable a software application to access files while enforcing privacy measures, according to some embodiments. It is noted that the procedures depicted in herein, according to some embodiments, can be performed by file view controller 112 operating in a sandboxed mode. In this fashion, application 110 cannot influence the procedures performed by file view controller 112, and is generally unaware of the activities performed by/within the file view controller 112.

As depicted in FIG. 2A, file view controller 112 can detect that a file selection process is initiated by application 110. In response, file view controller 112, using enumeration logic 202, can identify, e.g., in association with the application 110, at least one or more files that should be displayed within the file view controller 112 for access by a user. According to some embodiments, enumeration logic 202 can include actions that can be performed on files and directories in accordance with a pre-determined folder hierarchy. In this fashion, enumeration logic 202 can pertain to, but is not limited to, the manner in which folders are identified and/or queried; how top-level folders and sub-level folders are organized relative to a root directory; how folders are created and modified (e.g., adding a folder, deleting a folder, renaming a folder, etc.); how to display folder attributes (e.g., tags, last used date, file origins, thumbnails, etc.); how permissions can be set on folders; and so on.

It is noted that the enumeration logic 202 can be applied to any of the content (e.g., files, folders, etc.) made accessible to file view controller 112 by a number of different file access services 116, e.g., the file access services 116-1 and 116-2 illustrated in FIG. 2A. For instance, as depicted in FIG. 2A, the file access service 116-1 can include, under its domain, the files 206, 208, 210, 212, 214, and 216, and make them accessible to file view controller 112. File access service 116-1 can also manage enumeration logic 204 that can be applied to the files 206, 208, 210, 212, 214, and 216. Accordingly, the files 206, 208, 210, 212, 214, and 216 can be delivered to the file view controller 112 as an enumerated set of files according to the enumeration logic 204, whereupon the file view controller 112 can apply its own enumeration logic 202 as appropriate (as described in greater detail herein). In a similar fashion, file access service 116-2 can include, under its domain, the file 220, and make the file 220 accessible to the file view controller 112. File access service 116-2 can also manage enumeration logic 218 that can be applied to the file 220. In this manner, the file 220 can be delivered to the file view controller 112 as an enumerated set of files according to the enumeration logic 218, whereupon the file view controller 112 can apply its own enumeration logic 202 as appropriate (as described in greater detail herein).

With further reference to FIG. 2A, file view controller 112 can apply the enumeration logic 202 to the files 206, 208, 210, 212, 214, 216—as well as the file 220. As a result of applying enumeration logic 202, file view controller 112 can enable the files 206, 208, and 210 to be displayed within the file view controller 112 for selection. In this manner, the file view controller 112 can also the prevent application 110 from accessing/viewing files 212, 214, 216, and 220.

FIG. 2B illustrates how files, presented by file view controller 112, can be selected and provided to the application 110 while enforcing privacy measures, according to some embodiments. For instance, as illustrated in the file selection procedures depicted in FIG. 2B, file view controller 112 can independently generate a user interface 224 to display the files 206, 208, and 210 as a list of files that are available for user selection for application 110. In particular, a file list display window 226 can be a display region within the user interface 224 that displays files 206, 208, and 210 for user selection. According to some embodiments, file view controller 112 can detect when a user selects a file (e.g., selected file 228) from the list of files displayed within the file list display window 226. In response to the detection of selected file 228, file view controller 112 can communicate with file provider daemon 114 to perform further procedures. For example, according to some embodiments, the communications between file view controller 112 and file provider daemon 114 can include permission data (e.g., entitlement data) that can notify file provider daemon 114 that file view controller 112 has the appropriate permissions to receive information associated with selected file 228. In response, file provider daemon 114 can generate a corresponding entry within a table (e.g., access control table 230) that allows file provider daemon 114 to keep track of the different files application 110 is permitted to access.

Consider, for example, a scenario in which the application 110 is a word processing application, and the files 206, 208, and 210 are word processing documents that can be opened/accessed by the word processing application. In this scenario, the file 206 can be a desired document that a user seeks to load into the word processing application for editing. Accordingly, file provider daemon 114 can generate an entry within access control table 230 that corresponds to the user selecting the file 206 in association with the application 110. For example, as depicted in access control table 230, the entry generated by file provider daemon 114 can include data that identifies a domain name of the application 110 (e.g., "com.domain.wordprocessing_app"). Additionally, the entry generated by file provider daemon 114 can also include information associated with the file access service 116-1 associated with file 206, "com.vendor.application." Furthermore, the entry generated by file provider daemon 114 can also include information associated with an item identifier that corresponds to the file 206 (e.g., item ID value of "15"). Upon storing the entry within access control table 230, file provider daemon 114 can establish credentials that the application 110 can utilize to ultimately access the file 206. In particular, using the entry stored within access control table 230, file provider daemon 114 can generate a token (for receipt by application 110) that enables application 110 to access only the file 206, which is described below in greater detail.

Figure 3A:
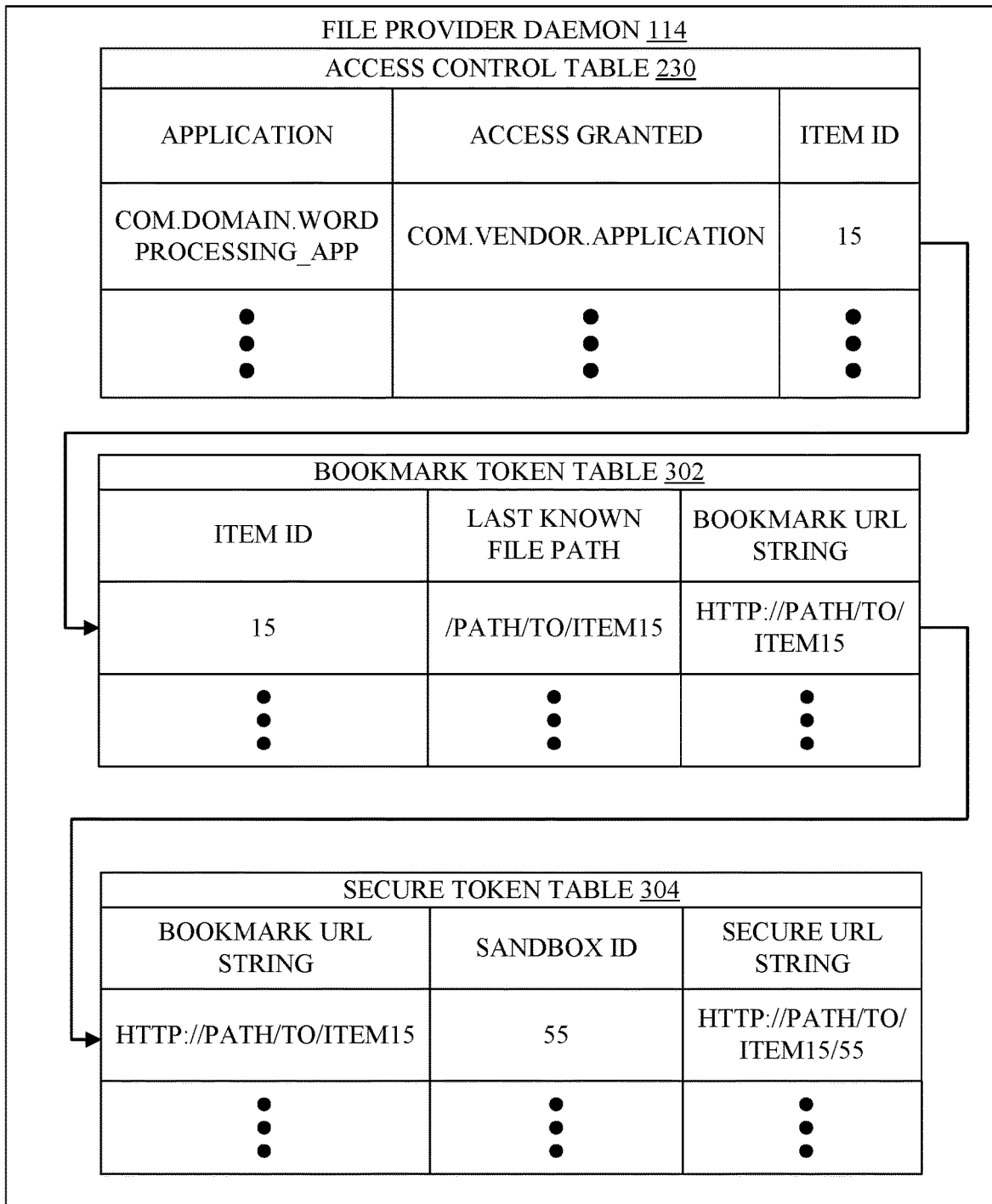
FIGS. 3A-3D illustrate additional exemplary user file selection communication procedures that can be performed to enable a software application to access files while enforcing privacy measures, according to some embodiments.

FIGS. 3A-3D illustrate additional exemplary user file selection communication procedures that can be performed to enable a software application to access files while enforcing privacy measures, according to some embodiments. In particular, FIG. 3A illustrates an overview 300 of how tokens can be generated by file provider daemon 114 to enable application 110 to access a selected file, according to some embodiments. As shown in FIG. 3A, file provider daemon 114 can communicate, to bookmark token table 302, data related to entries stored within access control table 230. In this manner, file provider daemon 114 can create a new entry within bookmark token table 302 that can be used to create a bookmark token. For example, the entry created by file provider daemon 114 and stored in bookmark table 302 can include data associated with the item identifier used to identify file 206 (e.g., item ID value of "15") within access control table 230. Additionally, the entry within bookmark table 302 can also include data associated with the last known file path used to access the file 206 (e.g., "/PATH/TO/ITEM15"). As depicted in FIG. 3A, using the data stored within bookmark token table 302 (e.g., item ID and a last known file path associated with the selected file), file provider daemon 114 can generate a URL string (e.g., "http://PATH/TO/ITEM15") that can be delivered a as a bookmark token for receipt by file view controller 112 and processing by application 110.

According to some embodiments, file provider daemon 114—like file view controller 112—can also operate in a sandboxed mode such that the ability of components operating outside of environment of file provider daemon 114 to access data stored by file provider daemon 114 is significantly limited and/or prevented. Accordingly, in order to access data from file provider daemon 114, components operating outside the environment of file provider daemon 114—e.g., the application 110—can be required to first provide secure bookmark tokens generated by file provider daemon 114. To establish a secure bookmark token, file provider daemon 114 can create a new entry within secure token table 304. In particular, file provider daemon 114 can communicate, to secure token table 304, data related to entries stored within bookmark token table 302. For example, the entry stored in secure token table 302 can include data associated with the URL string used to generate a previous bookmark token (e.g., "http://PATH/TO/ITEM15"). Additionally, the entry can also include data associated with a secure identifier (e.g., "sandbox ID") that is required by file provider daemon 114, for a component operating outside of the environment of file provider daemon 114, to access data stored by file provider daemon 114. As depicted in FIG. 3A, file provider daemon 114 can generate a sandbox ID ("55") that corresponds to a URL string (e.g., "http://PATH/TO/ITEM15") previously generated for a bookmark token.

By using secure identifiers (e.g., sandbox IDs) in this fashion, file provider daemon 114 can provide protection against URL strings that can potentially be derived by malicious entities. In some embodiments, secure identifiers can be generated and/or registered at a kernel-level within the OS 108. Furthermore, as depicted in FIG. 3A, using the data stored within secure token table 304 (e.g., bookmark string URL and sandbox ID), file provider daemon 114 can generate a secure URL string (e.g., "http://PATH/TO/ITEM15/55") that can be configured as a secure token for receipt and processing by application 110. As described in greater detail herein, the application can utilize the tokens generated by file provider daemon 114 to ultimately gain access to the file 206.

Figure 3B:
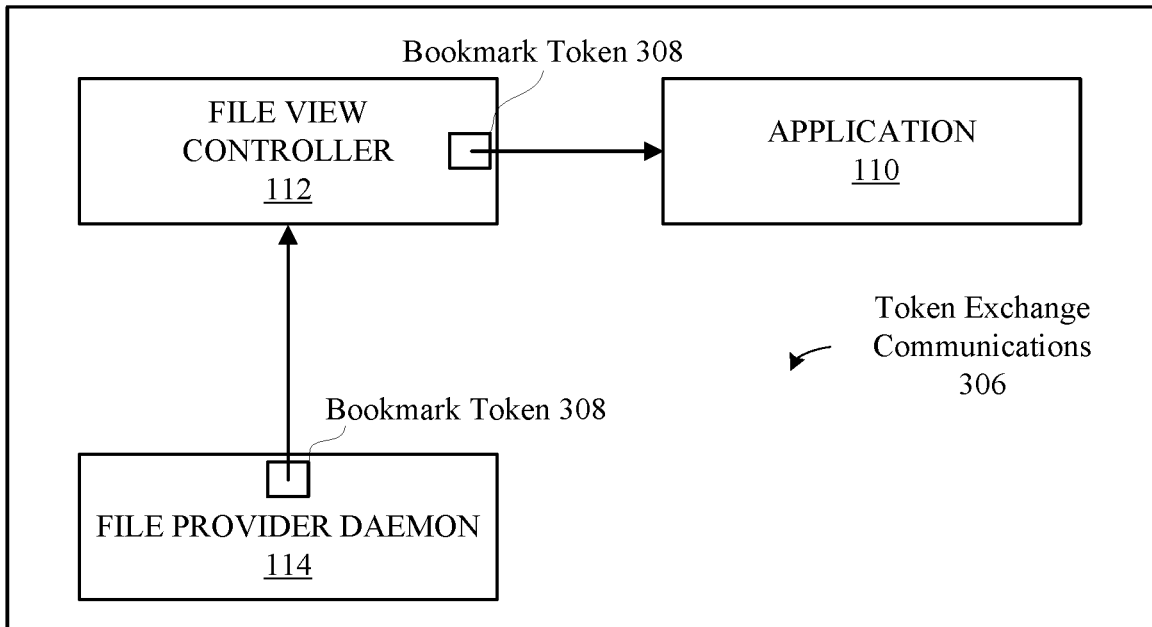
Figure 3B:
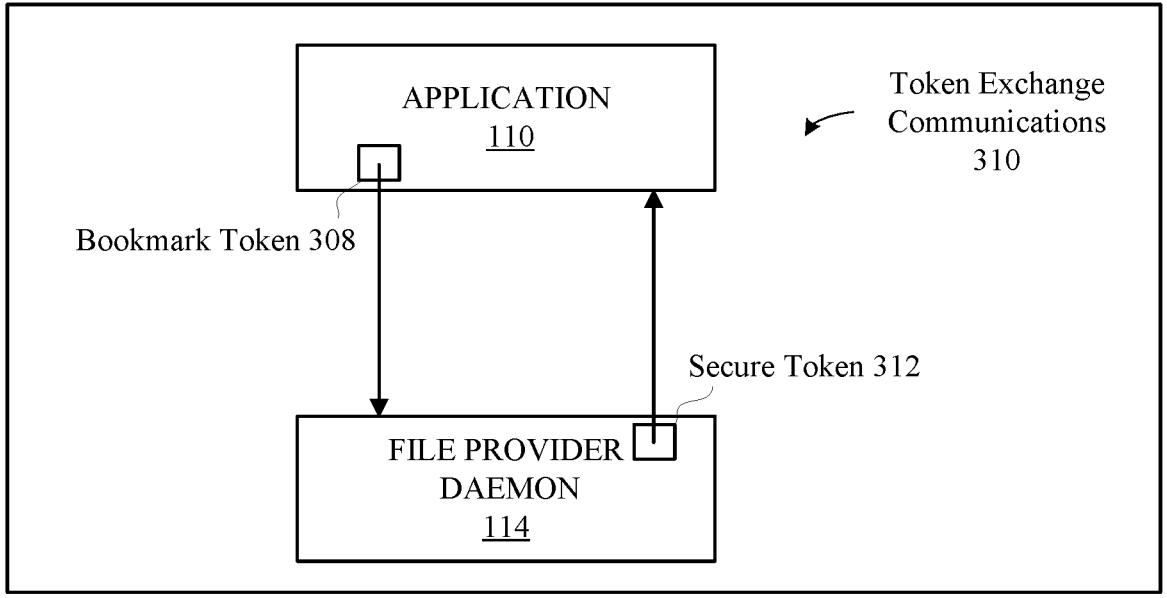

As depicted in token exchange communications 306 in FIG. 3B, bookmark token 308 can be generated by file provider daemon 114 and communicated to file view controller 112. According to some embodiments, bookmark token 308 can be converted into a resolvable URL that reveals a last known secure URL link produced by file provider daemon 114 to enable access to the file 206. In this fashion, the resolvable URL string includes updated data that can be used to reliably access file 206, regardless of whether the location of file 206 has been moved. Accordingly, file view controller 112 can pass bookmark token 308 to application 110, which can then perform procedures that convert bookmark token 308 into the resolvable URL string.

As depicted in token exchange communications 310 in FIG. 3B, application 110 can communicate the bookmark token 308 to the file provider daemon 114. Upon receipt of the bookmark token 308, the file provider daemon 114 can perform validation procedures on the bookmark token 308. For example, with reference to FIG. 3A, file provider daemon 114 can refer to access control table 230 to determine if the application 110 is a recognized application 110 within the access control table 230. Upon detecting a correspondence between the application 110 and an entry (e.g., "com.domain.wordprocessing_app") stored in access control table 230, file provider daemon 114 can determine that application 110 is, in fact, a recognized application 110.

Additionally, file provider daemon 114 can also reference bookmark token table 302 to determine if a URL string included in bookmark 308 is valid URL string recognized by file provider daemon 114. For example, file provider daemon 114 can analyze the URL string included in bookmark token 308 by comparing the URL string to entries stored in bookmark token table 302. With reference to FIG. 3A, upon detecting a correspondence between the URL string included in bookmark token 308 and an entry stored in bookmark token table 302 (e.g., "HTTP://PATH/TO/ITEM15"), file provider daemon 114 can determine that the URL string included in bookmark token 308 is, in fact, valid. In response, as depicted in token exchange communications 310 in FIG. 3B, file provider daemon 114 can generate and communicate the secure token 312 to the application 110.

Figure 3C:
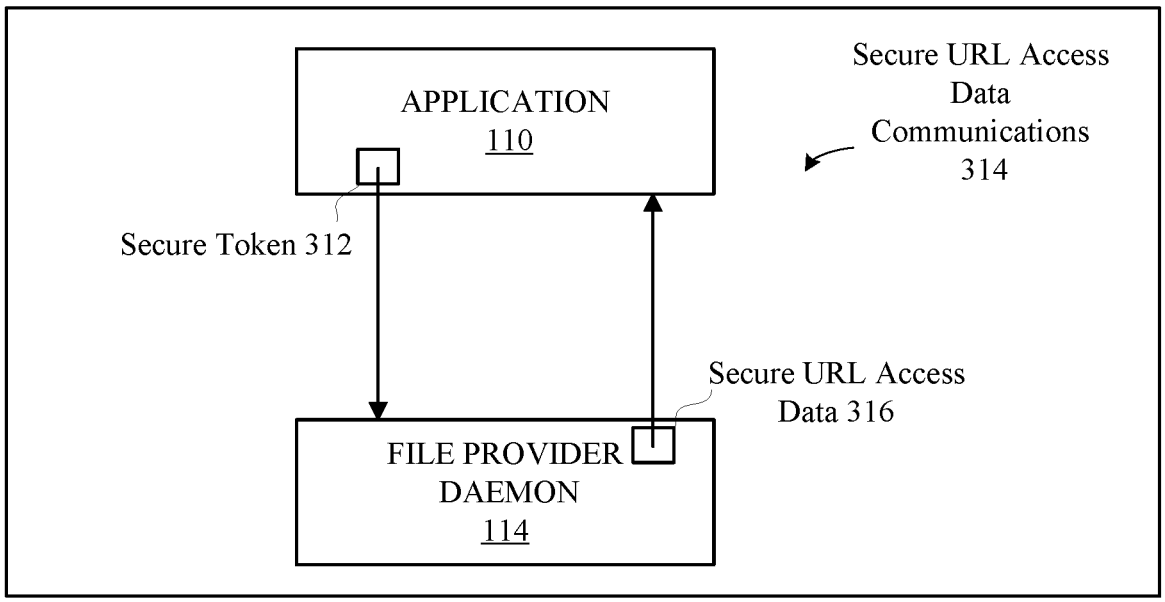
Figure 3C:
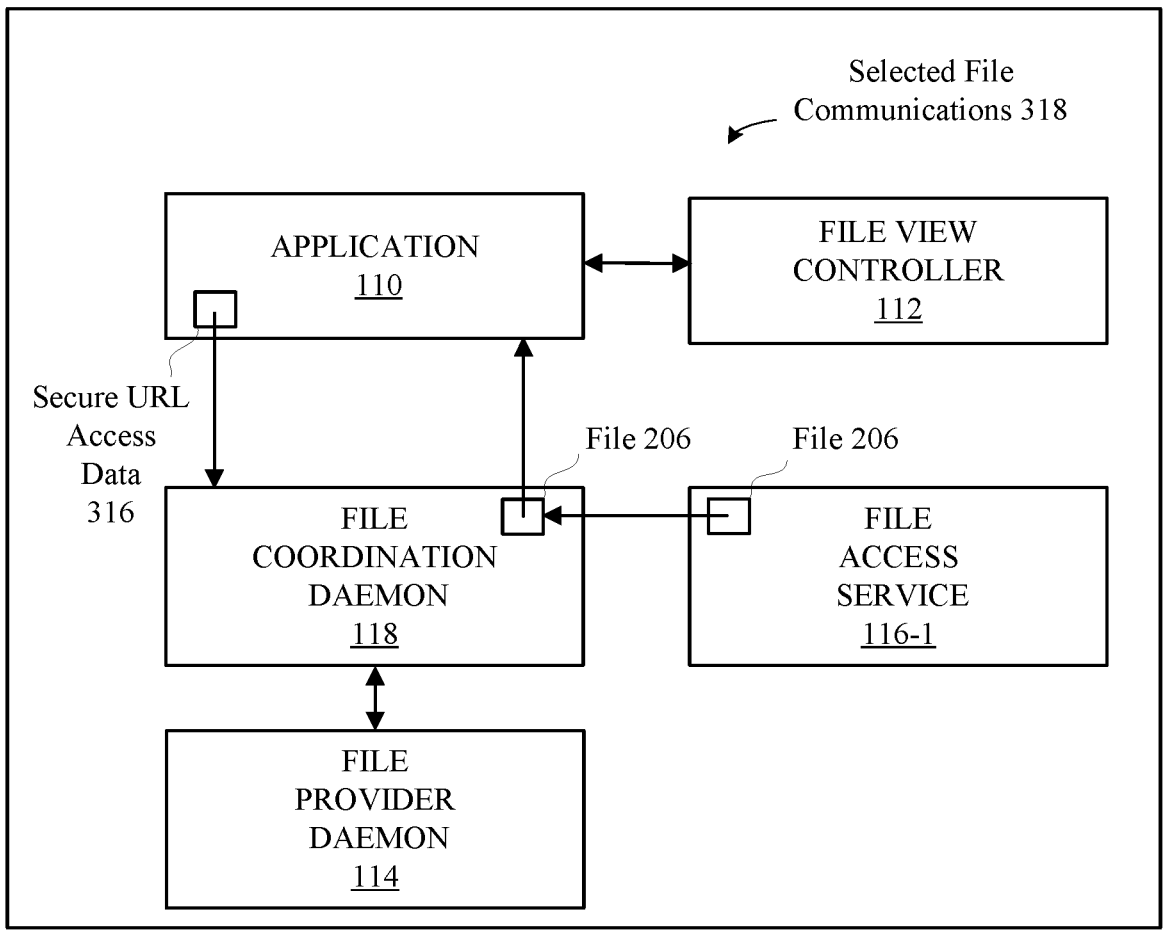

As depicted in secure URL access data communications 314 in FIG. 3C, application 110 can communicate, back to file provider daemon 114, secure token 312 to enable application 110 to access the file 206 via a secure URL string included in secure token 312. Upon receipt of the secure token 312, the file provider daemon 114 can perform validation procedures on the secure token 312 to determine if the application 110 possesses the proper credentials to access the file 206. For example, file provider daemon 114 can validate the secure token 312 by determining whether the secure token 312 includes a valid secure identifier by comparing identifiers included in the secure token 312 to recognizable secure identifiers stored in the secure token table 304. With reference to FIG. 3A, upon detecting a correspondence between the secure identifier included in the secure token 312 and an entry stored in the secure token table 304 (e.g., "sandbox ID 55"), the file provider daemon 114 can determine that the application 110 does, in fact, have the proper credentials to access the file 206. Accordingly, as depicted in secure URL access data communications 314 in FIG. 3C, the file provider daemon 114 can communicate, to the application 110, secure URL access data 316 that can be used to receive access to the file 206.

With reference to selected file communications 318 in FIG. 3C, prior to the receipt of access to file 206, the application 110 can engage in cooperative communications with the file coordination daemon 118 (and other applications when appropriate) such that the application 110 can receive a most recent version of file 206. By engaging in cooperative communications in this manner, each application 110 that seeks access to the file 206 can receive a version of the file 206 that includes any modifications that were previously made to the file 206 (e.g., modifications involving write operations performed on the file 206) prior to receipt.

According to some embodiments, the application 110 can communicate the secure URL access data 316 to the file provider daemon 114, which correspondingly interfaces with the file coordination daemon 118 to engage procedures to provide the application 110 with access to an updated version of file 206. According to some embodiments, the file coordination daemon 118 can engage in direct communications with the application 110 to provide the application 110 with access to an updated version of the file 206. For instance, upon receipt of the secure URL access data 316 from the application 110, the file coordination daemon 118 can perform validation procedures (e.g., using sandbox procedures) to determine whether the application 110 is authorized to access the file 206.

Although not explicitly depicted in FIG. 3C, the file coordination daemon 118 can communicate with the file provider daemon 114 to determine whether the application 110 has the proper authorization by performing verification procedures involving the use of data stored in the secure token table 304 and/or other tables used by the file provider daemon 114, or other verification procedures. Provided the file coordination daemon 118 verifies that the application 110 is, in fact, authorized to access to the file 206, the file coordination daemon 118 can use reference data to obtain information associated with one or more file access services 116 that are recognized (e.g., registered) by the file provider daemon 114.

For instance, according to some embodiments, the file coordination daemon 118 can analyze entries stored in a lookup table (e.g., a lookup table managed by the file provider daemon 114 or the file coordination daemon 118) for each file access service 116 that registers with the file provider daemon 114. The entry stored in the lookup table can include a set of information for each file access service 116, including data associated with a base URL that corresponds to each respective file access service 116 (e.g., provided items base URL, documents storage base URL, etc.). In this fashion, files that are "underneath" each base URL can be provided by their respective file access services 116 and managed by the file provider daemon 114. Accordingly, the file coordination daemon 118 can receive data from the file provider daemon 114 associated with each respective set of information for each file access service 116 and correspondingly manage read/write access to files underneath the base URL of each respective file access service 116.

Although not explicitly depicted in FIG. 3C, the file coordination daemon 118 can, as a continuation of the examples described above herein, receive data from the file provider daemon 114 that includes a set of information associated with the file access service 116-1, which can provide access to the file 206 to the application 110. The set of information can include files located underneath a base URL associated with the file access service 116-1. In this fashion, the file coordination daemon 118 can recognize that the file 206 is an item that falls underneath a base URL associated with the file access service 116-1. Accordingly, the file coordination daemon 118 can provide the application 110 with secure access to the file 206 in response to the file coordination daemon 118 receiving the secure URL access data 316 from the application 110. In this fashion, the application 110 can receive read/write privileges to modify the file 206. Moreover, the file access service 116-1 can also receive proper notification of any modifications made by the application 110 to the file 206 while it maintains read/write privileges to modify the file 206.

Figure 3D:
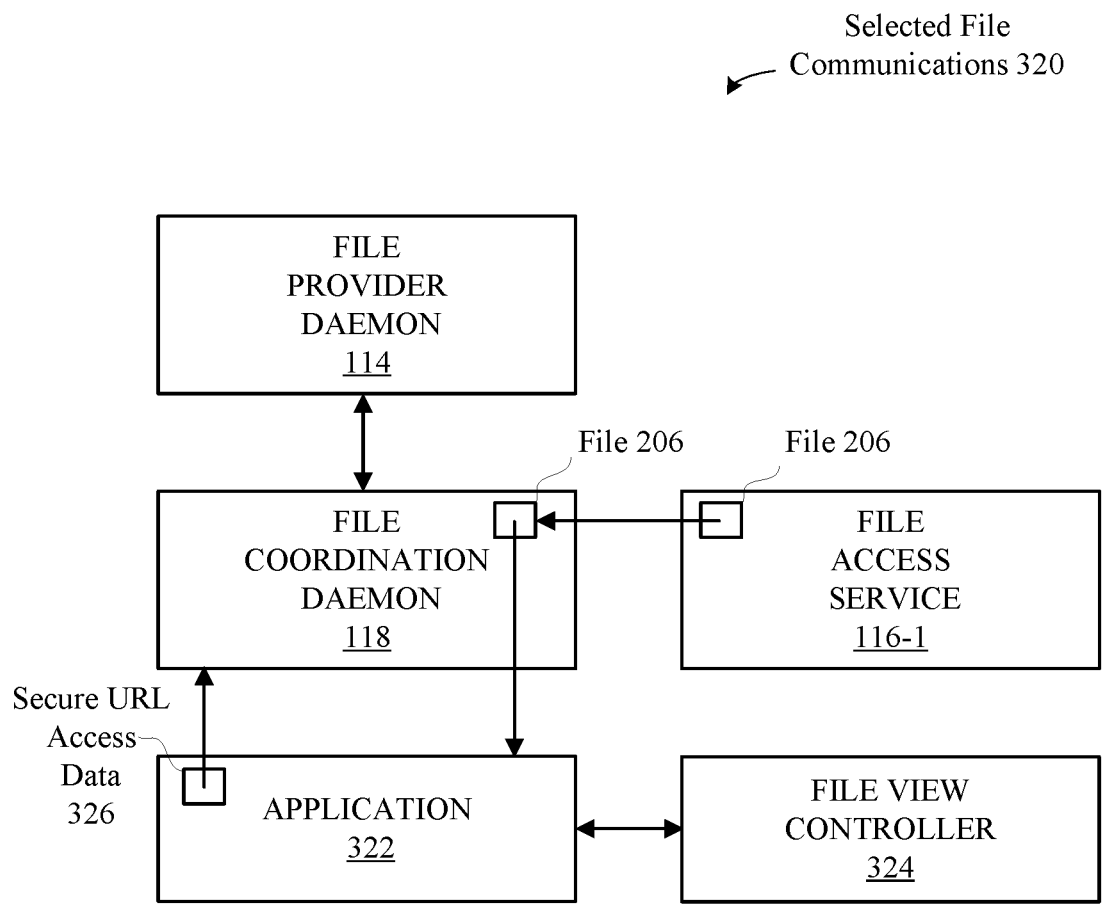

With reference to selected file communications 320 in FIG. 3D, the application 322 can be a different instantiation of the application 110 (e.g., different instantiation of the same word processing application executed remotely from computing device 102) that can receive access to the file 206 using similar procedures described herein. For instance, the application 322 can receive access to the file 206 using the file view controller 324, which can operate in a functional manner similar to the file view controller 112 as described herein. Based on communications with the file view controller 324—which acts on behalf of application 322—the file provider daemon 114 can generate an entry in the access control table 230, the bookmark token table 302, and the secure token table 304 that corresponds to requests issued by the application 322 to access the file 206 using similar procedures described herein with respect to the application 110. Thus, the application 322 can also receive a bookmark token and a secure token in a manner similar to that in which the application 110 obtained the bookmark token 308 and the secure token 312.

As illustrated in FIG. 3D, the application 322 can communicate the secure URL access data 326, which can include similar information included in the secure URL access data 316. Accordingly, the file coordination daemon 118 can perform similar validation procedures described herein to determine whether the application 322 is authorized to access the file 206. Additionally, the file coordination daemon 118 can also obtain the set of information associated with the access service 116-1 to allow the file coordination daemon 118 to locate the file 206 within its respective file location relative to the base URL corresponding to the file access service 116-1. Furthermore, the file coordination daemon 118 can provide the application 322 with secure access to the file 206, which allows the application 322 to receive read/write privileges to modify the file 206 in a manner similar to the way the application 110 received read/write privileges with respect to the file 206 in FIG. 3C. Accordingly, the application 322 can receive an updated version of the file 206 that includes any modifications made by the application 110.

Figure 4:
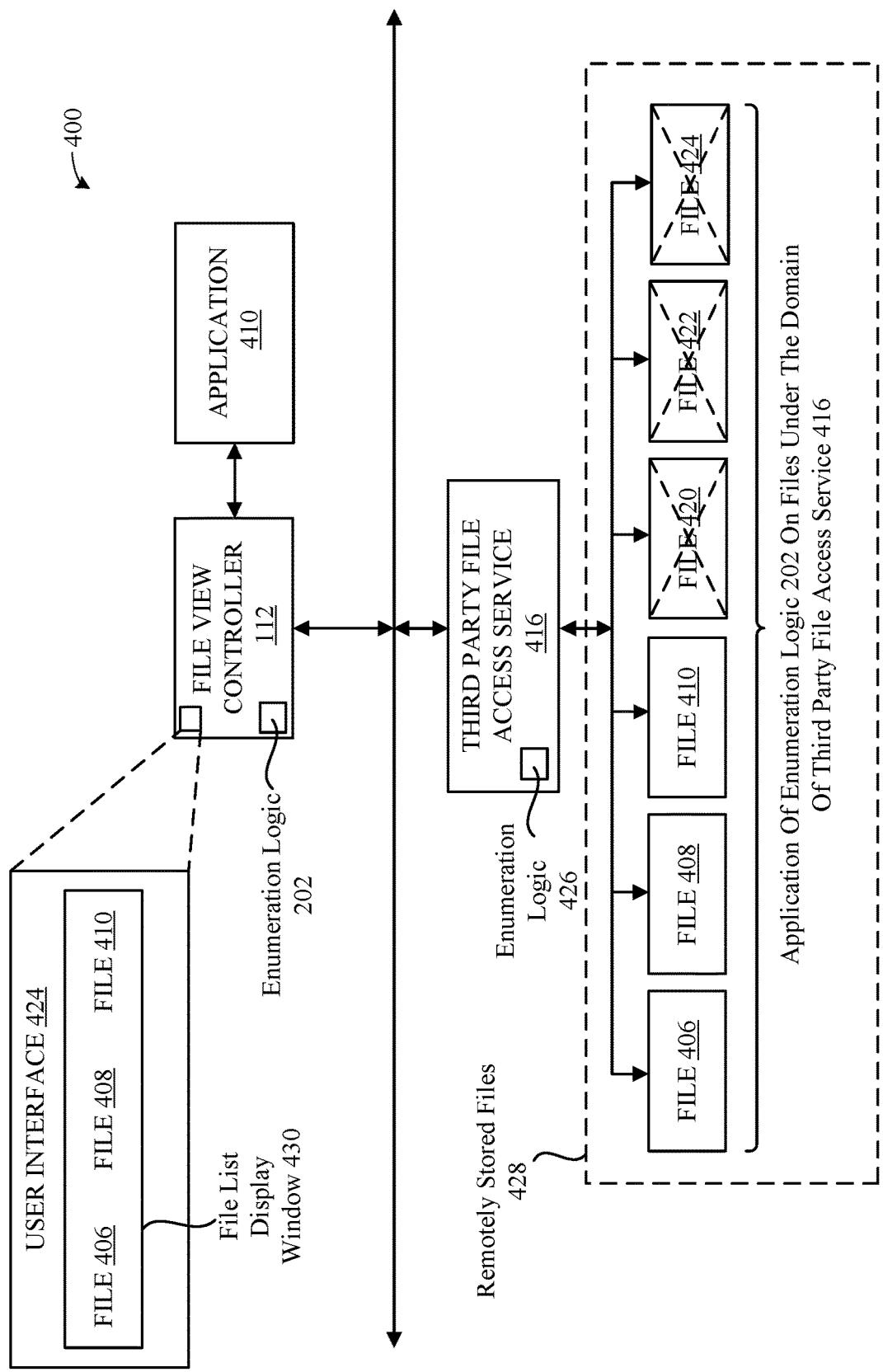
FIG. 4 illustrates exemplary user file selection processing procedures that can be performed to enable a software application to access remotely-stored files while enforcing privacy measures, according to some embodiments.

FIG. 4 illustrates how the file view controller 114 can selectively identify files for an application 410 to access remotely-stored files while enforcing privacy measures, according to some embodiments. According to some embodiments, the application 410 can represent an application that seeks access to remotely-stored files 428, which includes files 406, 408, 410, 420, 422, and 424. As depicted in FIG. 4, the remotely-stored files 428 can fall under the domain of a third-party file access service 416. According to some embodiments, the third-party file access service 416 can be a cloud storage file access service. As depicted in FIG. 4, file view controller 112 can detect that a file selection process is initiated by the application 410. In response, the file view controller 112, using enumeration logic 202, can identify at least one or more files that should have be presented for the file selection process. Accordingly, file view controller 112 can apply enumeration logic 202 to files and directories made accessible to file view controller 112 by the third-party file access service 416.

As depicted in FIG. 4, the third-party file access service 416 can also include enumeration logic 426 that can be applied to remotely-stored files 428. In this example, the remotely-stored files 428 can represent an enumerated set of files that are under the domain of the third-party file access service 416. As illustrated in FIG. 4, the file view controller 112 can apply enumeration logic 202 to the remotely-stored files 428. As a result of applying enumeration logic 202, the file view controller 114 can enable the files 406, 408 and 410 to become accessible for selection within the file view controller 112. In this manner, file view controller 112 can also prevent application 410 from accessing/viewing the files 420, 422, and 424. Furthermore, as illustrated in the file selection procedures 400 depicted in FIG. 4, the file view controller 112 can independently generate a user interface 424 to display the files 406, 408, and 410 as a list of files that are available for user selection to be accessed by the application 410. According to some embodiments, file list display window 430 can be a display region within the user interface 424 that displays the files 406, 408, and 410 for user selection.

Figure 5A:
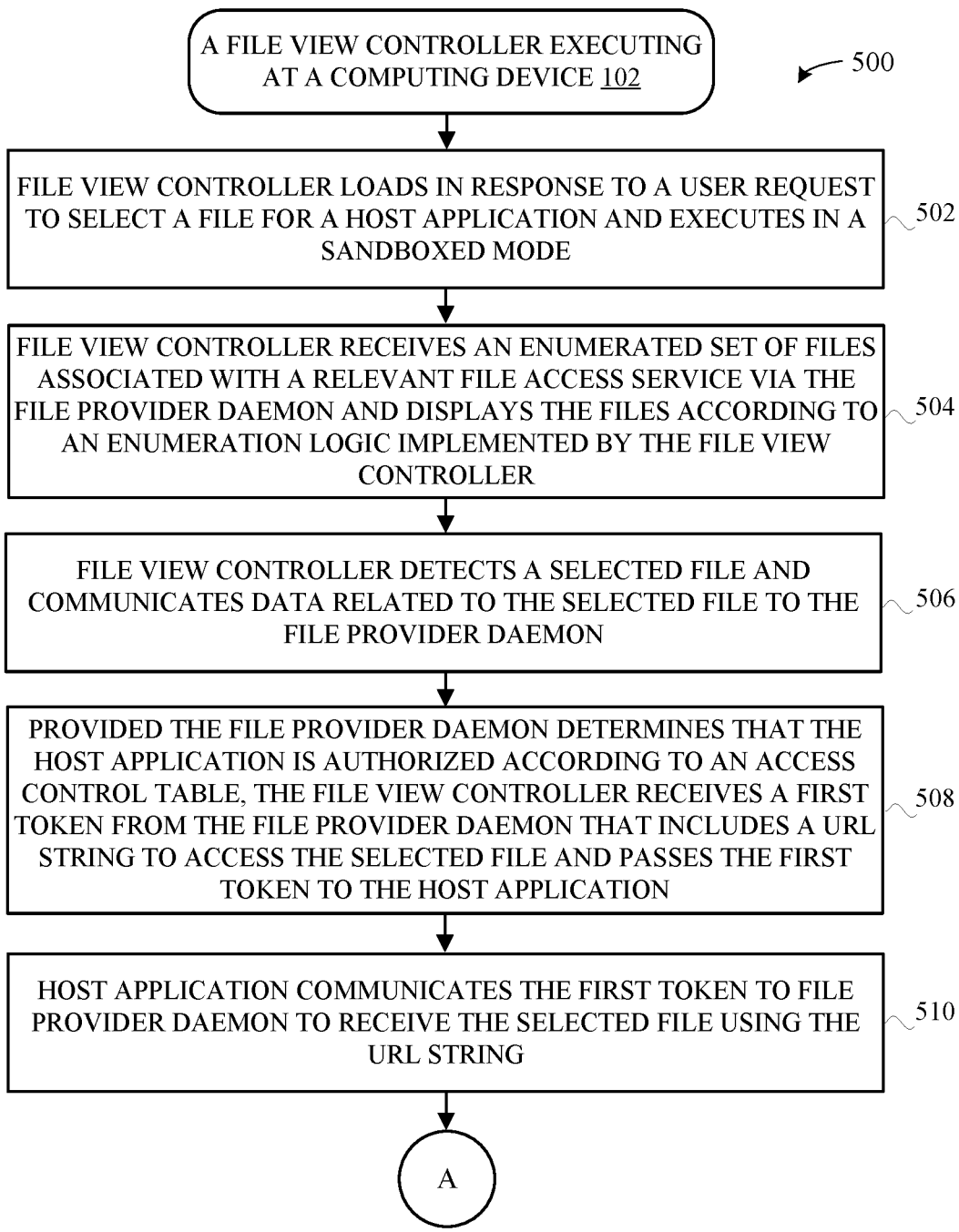
FIGS. 5A-5B illustrate a method for enabling a software application to access files while enforcing privacy measures, according to some embodiments.
Figure 5B:
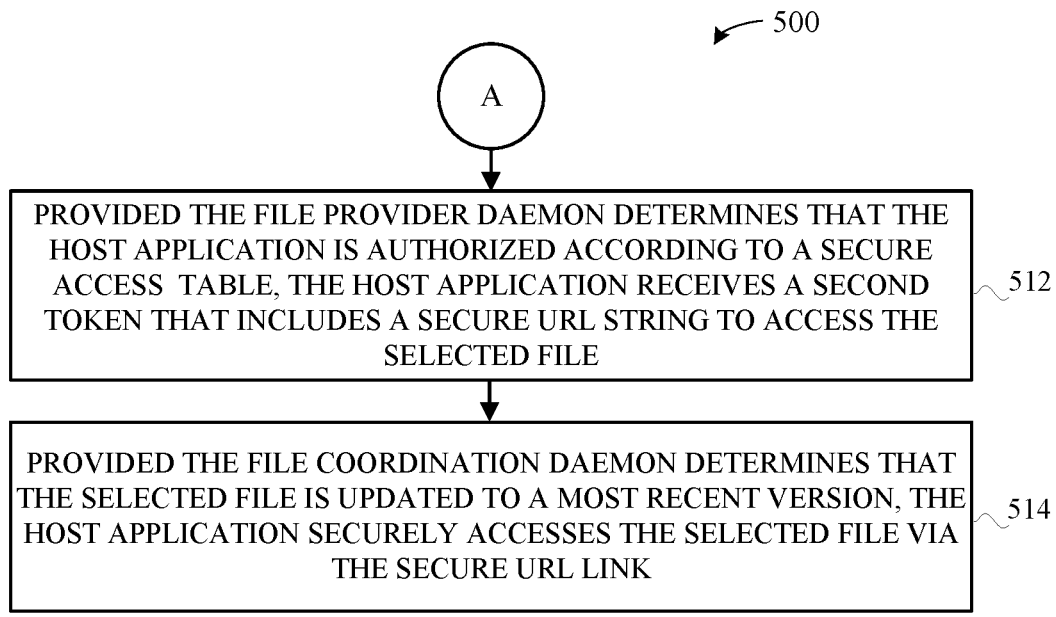

FIGS. 5A-5B illustrate a method 500 for enabling a software application to access files at a computing device while enforcing privacy measures, according to some embodiments. As shown in FIG. 5A, the method 500 can be implemented by a file view controller executing at the computing device 102, and begins at step 502, where the file view controller (1) is loaded in response to a user request to select a file for a host application, and (2) executes in a sandboxed mode. Next, at step 504, the file view controller receives, via a file provider daemon, an enumerated set of files associated with a relevant file access service, and displays the files according to an enumeration logic implemented by the file view controller.

Next, at step 506, the file view controller detects a selected file and communicates data related to the selected file to the file provider daemon. Next, at step 508, provided the file provider daemon determines that the host application is authorized according to an access control table, the file view controller (1) receives a first token from the file provider daemon that includes a URL string to access the selected file, and (2) passes the first token to the host application. Next, at step 510, the host application communicates the first token to the file provider daemon to receive the selected file using the URL string.

Next, at step 512 in FIG. 5B, provided the file provider daemon determines that the host application is authorized according to a secure access table, the host application receives a second token that includes a secure URL string to access the selected file. Next, at step 514, provided the file coordination daemon determines that the selected file is updated to a most recent version, the host application securely accesses the selected file via the secure URL link.

Figure 6:
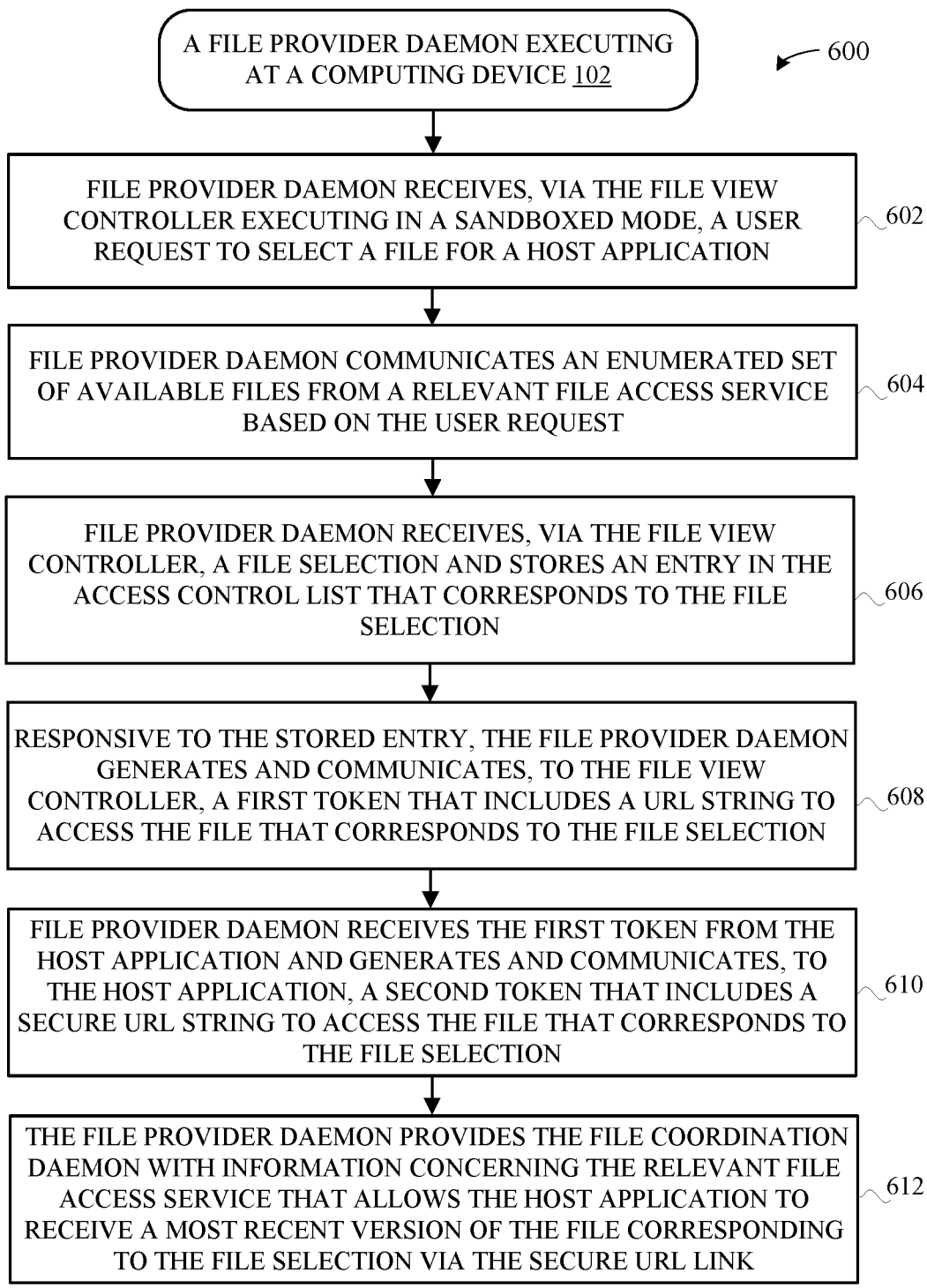
FIG. 6 illustrates another method for enable a software application to access files while enforcing privacy measures, according to some embodiments.

FIG. 6 illustrates a method 600 for enabling a software application to access files at a computing device while enforcing privacy measures, according to some embodiments. As shown in FIG. 6, the method 600 can be implemented by a file provider daemon executing at the computing device 102, and begins at step 602, where file provider daemon receives, via a file view controller executing in a sandboxed mode, a user request to select a file for a host application. Next, at step 604, the file provider daemon communicates an enumerated set of available files from a relevant file access service based on the user request. Next, at step 606, the file provider daemon receives, via the file view controller, a file selection and stores an entry in an access control list that corresponds to the file selection.

Next, at step 608, responsive to the stored entry, the file provider daemon generates and communicates, to the file view controller, a first token that includes a URL string to access the file corresponding to the file selection. Next, at step 610, the file provider daemon receives the first token from the host application and generates/communicates, to the host application, a second token that includes a secure URL string to access the file that corresponds to the file selection. Finally, at step 612, the file provider daemon provides the file coordination daemon with information associated with the relevant file access service that allows the host application to receive a most recent version of the file corresponding to the file selection via the secure URL link.

FIG. 7 illustrates a detailed view of a computing device 700 that can be used to implement the various components described herein, according to some embodiments. In particular, the detailed view illustrates various components that can be included in the computing device 102 illustrated in FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also include the storage device 740, which can comprise a single disk or a collection of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of applications executing on the computing device 102, including applications 110, a file view controller 112, a file provider daemon 114, file access services 116, and a file coordination daemon 118.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a software application to access files at a computing device while enforcing privacy measures, the method comprising, at a file view controller executing by way of an operating system implemented on the computing device:
   receiving, from the software application, a request to access at least one of the files;
   displaying a file browser in association with the software application, wherein the file browser is communicably coupled with one or more file access services executing at the computing device, and the file browser executes in a mode such that the software application cannot identify any content displayed within the file browser;
   displaying, within the file browser, a first plurality of files associated with a first file access service of the one or more file access services; and
   in response to receiving, via the file browser, a selection of at least one file among the first plurality of files displayed within the file browser:
      generating and providing, to the software application, a security token that enables the software application to access only the selected at least one file.

2. The method of claim 1, further comprising, in response to receiving, via the file browser, a second request to display a second plurality of files associated with a second file access service that is different from the first file access service:
   displaying, within the file browser, the second plurality of files.

3. The method of claim 2, wherein the first file access service is associated with files stored locally at the computing device, and the second file access service is associated with files stored remotely from the computing device.

4. The method of claim 1, wherein the security token comprises a last known secure URL link produced by a file provider daemon to directly access the at least one file, and the last known secure URL link comprises a secure identifier portion and a file path URL portion.

5. The method of claim 4, further comprising:
   communicating, to the file provider daemon, a second request by the software application to use the security token; and
   receiving a new security token from the file provider daemon, wherein the new security token comprises a current secure URL link to directly access the at least one file.

6. The method of claim 1, wherein the first plurality of files is displayed within the file browser in accordance with an enumeration of the first plurality of files provided by the first file access service, and the method further comprises:
   further-arranging the first plurality of files within the file browser in accordance with configuration properties associated with the file browser.

7. The method of claim 1, wherein the file browser is loaded in response to receiving the request from the software application.

8. At least one non-transitory computer readable storage medium configured to store instructions that, when executed by at least one processor included in a computing device, cause the computing device to enable a software application to access files at the computing device while enforcing privacy measures, by carrying out steps that include:
   receiving, from the software application, a request to access at least one of the files;
   displaying a file browser in association with the software application, wherein the file browser is communicably coupled with one or more file access services executing at the computing device, and the file browser executes in a mode such that the software application cannot identify any content displayed within the file browser;
   displaying, within the file browser, a first plurality of files associated with a first file access service of the one or more file access services; and
   in response to receiving, via the file browser, a selection of at least one file among the first plurality of files displayed within the file browser:
      generating and providing, to the software application, a security token that enables the software application to access only the selected at least one file.

9. The at least one non-transitory computer readable storage medium of claim 8, wherein the steps further include, in response to receiving, via the file browser, a second request to display a second plurality of files associated with a second file access service that is different from the first file access service:
   displaying, within the file browser, the second plurality of files.

10. The at least one non-transitory computer readable storage medium of claim 9, wherein the first file access service is associated with files stored locally at the computing device, and the second file access service is associated with files stored remotely from the computing device.

11. The at least one non-transitory computer readable storage medium of claim 8, wherein the security token comprises a last known secure URL link produced by a file provider daemon to directly access the at least one file, and the last known secure URL link comprises a secure identifier portion and a file path URL portion.

12. The at least one non-transitory computer readable storage medium of claim 11, wherein the steps further include:
communicating, to the file provider daemon, a second request by the software application to use the security token; and
receiving a new security token from the file provider daemon, wherein the new security token comprises a current secure URL link to directly access the at least one file.

13. The at least one non-transitory computer readable storage medium of claim 8, wherein the first plurality of files is displayed within the file browser in accordance with an enumeration of the first plurality of files provided by the first file access service, and the steps further include:
further-arranging the first plurality of files within the file browser in accordance with configuration properties associated with the file browser.

14. The at least one non-transitory computer readable storage medium of claim 8, wherein the file browser is loaded in response to receiving the request from the software application.

15. A computing device configured to enable a software application to access files at the computing device while enforcing privacy measures, the computing device comprising:
at least one processor, and at least one memory storing instructions that, when executed by the at least one processor, cause the computing device to perform steps that include:
receiving, from the software application, a request to access at least one of the files;
displaying a file browser in association with the software application, wherein the file browser is communicably coupled with one or more file access services executing at the computing device, and the file browser executes in a mode such that the software application cannot identify any content displayed within the file browser;
displaying, within the file browser, a first plurality of files associated with a first file access service of the one or more file access services; and
in response to receiving, via the file browser, a selection of at least one file among the first plurality of files displayed within the file browser:
generating and providing, to the software application, a security token that enables the software application to access only the selected at least one file.

16. The computing device of claim 15, wherein the at least one processor further causes the computing device to perform steps that include, in response to receiving, via the file browser, a second request to display a second plurality of files associated with a second file access service that is different from the first file access service:
displaying, within the file browser, the second plurality of files.

17. The computing device of claim 16, wherein the first file access service is associated with files stored locally at the computing device, and the second file access service is associated with files stored remotely from the computing device.

18. The computing device of claim 15, wherein the security token comprises a last known secure URL link produced by a file provider daemon to directly access the at least one file, and the last known secure URL link comprises a secure identifier portion and a file path URL portion.

19. The computing device of claim 18, wherein the at least one processor further causes the computing device to perform steps that include:
communicating, to the file provider daemon, a second request by the software application to use the security token; and
receiving a new security token from the file provider daemon, wherein the new security token comprises a current secure URL link to directly access the at least one file.

20. The computing device of claim 15, wherein the first plurality of files is displayed within the file browser in accordance with an enumeration of the first plurality of files provided by the first file access service, and the steps further include:
further-arranging the first plurality of files within the file browser in accordance with configuration properties associated with the file browser.

* * * * *